(12) United States Patent
Choi

(10) Patent No.: US 9,561,815 B2
(45) Date of Patent: Feb. 7, 2017

(54) CART WITH EASY ACCOMMODATION OF HANDLE BY SPRING

(71) Applicant: Sejin Engineering Co., Ltd., Yangsan-si (KR)

(72) Inventor: Young Yong Choi, Busan (KR)

(73) Assignee: Sejin Engineering Co., Ltd., Yangsan-si (KR)

( * ) Notice: Subject to any disclaimer, the term of this patent is extended or adjusted under 35 U.S.C. 154(b) by 0 days.

(21) Appl. No.: 14/906,555

(22) PCT Filed: May 30, 2014

(86) PCT No.: PCT/KR2014/004854
§ 371 (c)(1),
(2) Date: Jan. 21, 2016

(87) PCT Pub. No.: WO2015/012486
PCT Pub. Date: Jan. 29, 2015

(65) Prior Publication Data
US 2016/0152257 A1    Jun. 2, 2016

(30) Foreign Application Priority Data

Jul. 22, 2013    (KR) .......................... 10-2013-0085997
Jan. 20, 2014    (KR) .......................... 10-2014-0006843

(51) Int. Cl.
*B62B 5/06*    (2006.01)
*B62B 3/02*    (2006.01)
*B62B 3/00*    (2006.01)

(52) U.S. Cl.
CPC ................. *B62B 5/067* (2013.01); *B62B 3/00* (2013.01); *B62B 3/02* (2013.01); *B62B 5/06* (2013.01)

(58) Field of Classification Search
CPC .............. B62B 5/067; B62B 3/00; B62B 5/06; B62B 5/066; B62B 3/02
(Continued)

(56) References Cited

U.S. PATENT DOCUMENTS 5,484,046 A  *  1/1996  Alper ..................... A45C 5/146
                                                              190/115
6,536,796 B1  *  3/2003  Solomon ................... B62B 3/02
                                                              280/47.34
(Continued)

FOREIGN PATENT DOCUMENTS

JP          07-013642          3/1995
JP        2010-024987          2/2010
(Continued)

OTHER PUBLICATIONS

International Search Report Dated Sep. 29, 2014 From the Korean Intellectual Property Office Re. PCT/KR2014/004854 and Its Translation Into English.

*Primary Examiner* — Hau Phan
*Assistant Examiner* — Jacob Meyer

(57) ABSTRACT

The present invention relates to a cart with easy accommodation of a handle by a spring, comprising: a loading plate in which articles are loaded at the upper portion, a cut groove is vertically penetrated to be formed at the front end, the front end is opened at the lower portion so as to be horizontally penetrated to the back end, and a space part is formed to communicate with the cut groove; driving wheels provided at the lower part of the loading plate; a cover to be coupled to the lower part of the space part; a handle member accommodated in the space part so as to be moved to the front end of the loading plate, and rotated toward the cut groove so as to be exposed to the upper part of the loading plate; a stopper formed at the cut groove side in the space portion and preventing the separation of the handle member;

(Continued)

and a spring unit comprising a fixture provided in the back of the space part, a rotation shaft provided at the fixture, and a spring wound to the rotation shaft and of which an end is connected to the handle member so as to allow the handle member to be accommodated in the space part by a rotational restoring force when an external force is removed, wherein a handle portion can be easily accommodated at the lower part of the cart.

5 Claims, 5 Drawing Sheets

(58) Field of Classification Search
USPC ............................ 280/655, 47.315, 47.371
See application file for complete search history.

(56) References Cited

U.S. PATENT DOCUMENTS

| | | | | |
|---|---|---|---|---|
| 6,845,991 | B1* | 1/2005 | Ritucci | B62B 3/007 |
| | | | | 280/30 |
| 6,877,764 | B2* | 4/2005 | Sagol | B62B 5/06 |
| | | | | 280/47.371 |
| 7,201,385 | B2* | 4/2007 | Renz | B62B 3/02 |
| | | | | 280/47.34 |
| 7,462,009 | B2* | 12/2008 | Hartmann | B62B 5/049 |
| | | | | 280/47.371 |
| 7,588,257 | B2* | 9/2009 | Gu | B62B 3/16 |
| | | | | 280/32.6 |
| 7,784,816 | B2* | 8/2010 | Jian | B62B 3/02 |
| | | | | 280/38 |
| 8,827,305 | B2* | 9/2014 | Saito | B62B 5/067 |
| | | | | 280/655.1 |
| 9,067,614 | B2* | 6/2015 | Vanderberg | B62B 3/16 |
| 2004/0232660 | A1* | 11/2004 | Chen | B62B 3/02 |
| | | | | 280/651 |
| 2008/0012260 | A1* | 1/2008 | Ouyang | B62B 3/1476 |
| | | | | 280/79.11 |
| 2011/0221148 | A1* | 9/2011 | Annese | B62B 5/067 |
| | | | | 280/47.34 |
| 2014/0077468 | A1* | 3/2014 | Arnold | B62B 3/02 |
| | | | | 280/38 |
| 2016/0090114 | A1* | 3/2016 | Rackleff | B62B 5/0079 |
| | | | | 280/415.1 |

FOREIGN PATENT DOCUMENTS

| | | |
|---|---|---|
| KR | 20-1998-0011180 | 5/1998 |
| KR | 20-0371893 | 1/2005 |
| KR | 20-2013-0000273 | 1/2013 |
| KR | 10-1352338 | 1/2014 |
| WO | WO 2015/012486 | 1/2015 |

\* cited by examiner

CART WITH EASY ACCOMMODATION OF HANDLE BY SPRING

RELATED APPLICATIONS

This application is a National Phase of PCT Patent Application No. PCT/KR2014/004854 having International filing date of May 30, 2014, which claims the benefit of priority of Korean Patent Applications Nos. 10-2013-0085997 filed on Jul. 22, 2013, and 10-2014-0006843 filed on Jan. 20, 2014. The contents of the above applications are all incorporated by reference as if fully set forth herein in their entirety.

FIELD AND BACKGROUND OF THE INVENTION

The present invention relates to a cart with easy accommodation of a handle by a spring, and to a cart with easy accommodation of a handle by a spring in which a handle is easily accommodated under a cart capable of loading articles to carry by using a restoring force of a spring.

In general, a cart is configured to load articles and move the articles. As the cart, a cart which has a plate shape, and is provided with driving wheels on a lower side thereof or is provided with a handle has been mostly used.

As the related art similar to the present invention, Korean Registration Patent No. 10-123973 discloses "Transport Cart".

FIG. 1 is a configuration diagram showing a transport cart of the related art. The transport cart is provided with a loading plate 10 having a predetermined area. The transport cart is configured such that wheels 11 are provided in corners on a bottom surface of the loading plate 10; guide rails 30 are provided on both sides of the bottom surface of the loading plate 10, cut grooves 31 are formed in the guide rails 30 so as to face each other, and movement grooves 32 are moved at upper centers of front ends of the guide rails 30; and movement members 40 are fitted to the guide rails 30, hinge means 50 for allowing a transport handle 20 to erect or lie is fixed to the movement members 40, the hinge means 50 includes a fixation rod 53 coupled to the movement members 40 fitted to the guide rails 30 through a hinge 51, the transport handle 20 provided with a safe plate 21 is fixed to the fixation rod 53, a fixation ring 55 is coupled to the outside of the fixation rod 53, a fixation groove 54 is formed at the fixation ring 55, and a fixation pin 52 is formed in the fixation rod 53. Thus, it is possible to accommodate the handle under the cart.

However, in the related art, the handle is inserted under the cart. However, since the handle is folded, the configuration thereof is complicated, and there is a troublesome problem that a predetermined force is applied to the lower side.

SUMMARY OF THE INVENTION

The invention has been made in order to solve such problems, and it is an object of the present invention to provide a cart with easy accommodation of a handle by a spring with which it is possible to use a handle by pulling out the handle when necessary and it is possible to quickly accommodate the handle under the cart.

In order to achieve the above object, the present invention provides a cart with easy accommodation of a handle by a spring. The cart includes a loading plate that is configured to load articles on an upper side thereof, and is provided with a cut groove which is formed at a front end to vertically penetrate the loading plate and a space which is formed on a lower side to have an opened front end, horizontally penetrates from the front end to a rear end, and is communicatively connected to the cut groove; driving wheels that are provided on a lower side of the loading plate; a cover that is coupled to a lower side of the space; a handle member that is accommodated in the space, is moved toward the front end of the loading plate by an external force, is rotated to the cut groove, and is exposed to the upper side of the loading plate; a stopper that is formed in the space so as to be close to the cut groove, and prevents the handle member from being separated; and a spring unit that includes a fixation member which is provided at a rear side of the space, a rotational shaft which is provided at the fixation member, and a spring which is wound around the rotational shaft and of which an end is connected to the handle member to allow the handle member to be accommodated in the space by a rotation restoring force when an external force is cancelled. The handle member includes a lower bar which is connected to the spring, an intermediate bar which is connected to a central portion of the lower bar at a right angle, and an upper bar which extends from an end of the intermediate bar at a right angle, a first hole which is formed at one end in a longitudinal direction and penetrates from the outside to the inside, and a second hole which is formed in the inside so as to have a penetrating area greater than a penetrating area of the first hole are formed in the lower bar, and the holes are communicatively connected, and engagement members having a size corresponding to the second hole are formed at an end of the spring, and are fixed by being inserted into one end of the lower bar.

The fixation member may be paired so as to be separated on both sides, accommodation grooves may be formed on the insides thereof, and both ends of the rotational shaft may be rotatably supported.

The stopper may interfere with the lower bar, and may have a plate shape in which a hole having a diameter greater than a diameter of the intermediate bar is formed in a central portion thereof.

Hooks that are connected to the end of the spring may be further provided at the lower bar, and the handle member is rotated around the spring unit.

A fastening stopper that protrudes toward both sides of an inlet may be formed at the cut groove, and may provide a fastening pressurization force to the intermediate bar, and the handle member may be prevented from rotating when the handle member is coupled to the cut groove.

According to the present invention having the above-described configuration, the following effect can be obtained.

First, when the handle is not used, the handle member is inserted under the cart, and thus, it is possible to easily store the cart by minimizing the volume of the cart. It is possible to easily move the cart in a narrow space.

It is possible to use the handle by being exposed to the upper side of the loading plate when necessary, and it is possible to automatically inset the handle into the lower side of the loading plate by the rotation restoring force of the spring when it is not necessary to use the handle.

Figure 1:
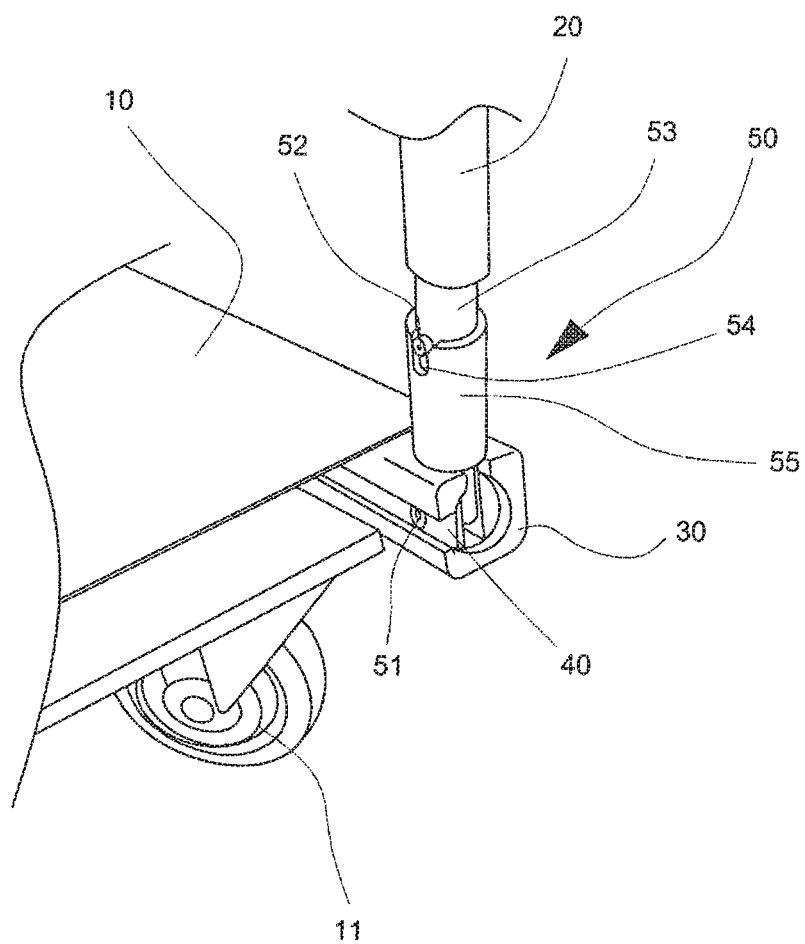
FIG. 1 is a configuration diagram showing a transport cart of the related art.

Description of Main Reference Numerals of Drawings

| | |
|---|---|
| 100: Loading plate | 120: Space |
| 122: Cut groove | 123: Fastening stopper |
| 200: Driving wheels | 300: Cover |
| 400: Handle member | 420: Lower bar |
| 440: Intermediate bar | 460: Upper bar |
| 500: Stopper | 600: Spring unit |
| 620: Fixation member | 640: Rotational shaft |
| 660: Spring | |

BEST MODE

The present invention provides a cart with easy accommodation of a handle by a spring. The cart includes a loading plate that is configured to load articles on an upper side thereof, and is provided with a cut groove which is formed at a front end to vertically penetrate the loading plate and a space which is formed on a lower side to have an opened front end, horizontally penetrates from the front end to a rear end, and is communicatively connected to the cut groove; driving wheels that are provided on a lower side of the loading plate; a cover that is coupled to a lower side of the space; a handle member that is accommodated in the space, is moved toward the front end of the loading plate by an external force, is rotated to the cut groove, and is exposed to the upper side of the loading plate; a stopper that is formed in the space so as to be close to the cut groove, and prevents the handle member from being separated; and a spring unit that includes a fixation member which is provided at a rear side of the space, a rotational shaft which is provided at the fixation member, and a spring which is wound around the rotational shaft and of which an end is connected to the handle member to allow the handle member to be accommodated in the space by a rotation restoring force when an external force is cancelled. The handle member includes a lower bar which is connected to the spring, an intermediate bar which is connected to a central portion of the lower bar at a right angle, and an upper bar which extends from an end of the intermediate bar at a right angle, a first hole which is formed at one end in a longitudinal direction and penetrates from the outside to the inside, and a second hole which is formed in the inside so as to have a penetrating area greater than a penetrating area of the first hole are formed in the lower bar, and the holes are communicatively connected, and engagement members having a size corresponding to the second hole are formed at an end of the spring, and are fixed by being inserted into one end of the lower bar.

DESCRIPTION OF SPECIFIC EMBODIMENTS OF THE INVENTION

Hereinafter, preferred embodiments of the present invention will be described with reference to the accompanying drawings.

A cart with easy accommodation of a handle by a spring according to the present invention mainly includes a loading plate, driving wheels, a cover, a handle member, a stopper, and a spring unit.

Figure 2:
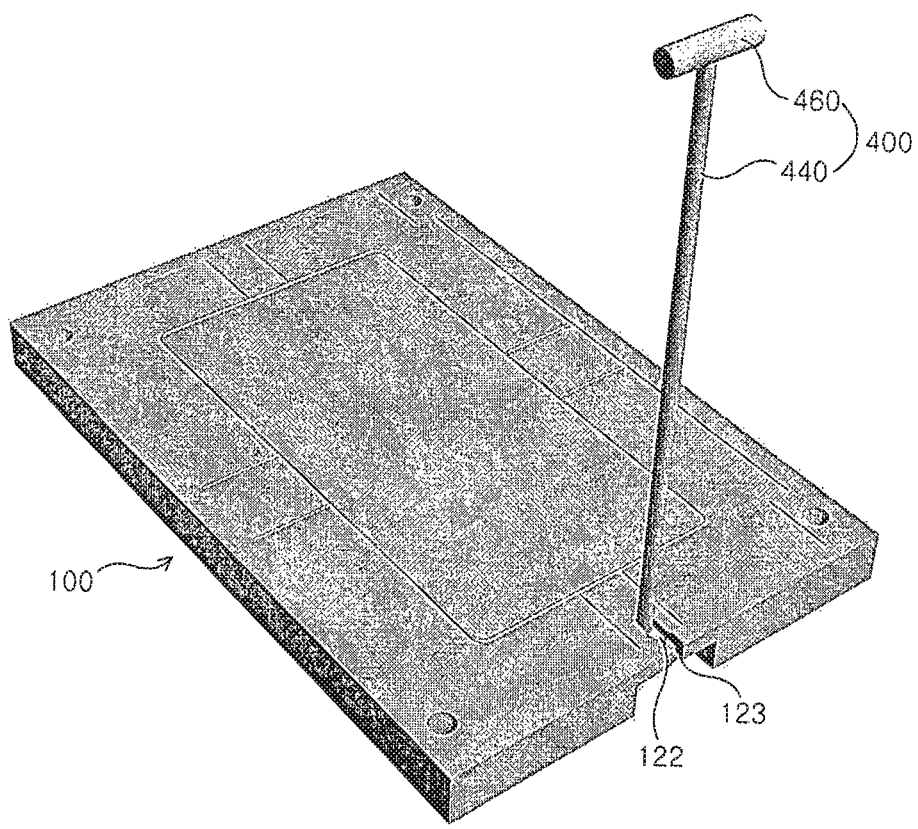
FIG. 2 is a top perspective view of a cart with easy accommodation of a handle by a spring according to an embodiment of the present invention.

FIG. 2 is a top perspective view of the cart with easy accommodation of a handle by a spring according to the embodiment of the present invention.

Referring to FIG. 2, the loading plate 100 is configured to load articles, and is formed in a plate shape.

The articles are loaded on an upper side of the loading plate 100. A cut groove 122 which vertically penetrates the loading plate is formed at a front end thereof, and a space 120 which horizontally penetrates the loading plate from the front end to a rear end, is communicatively connected to the cut groove 122, and has an opened front end is formed as shown in FIG. 3.

A fastening stopper 123 which protrudes toward both sides of an inlet of the cut groove 122 is formed to provide a fastening pressurization force to an intermediate bar 440, and thus, the handle member 400 can be prevented from rotating when the handle member is coupled to the cut groove 122.

Here, it is preferable that the fastening stopper 123 protrudes such that the end thereof is round and has elasticity to some extent.

Figure 3:
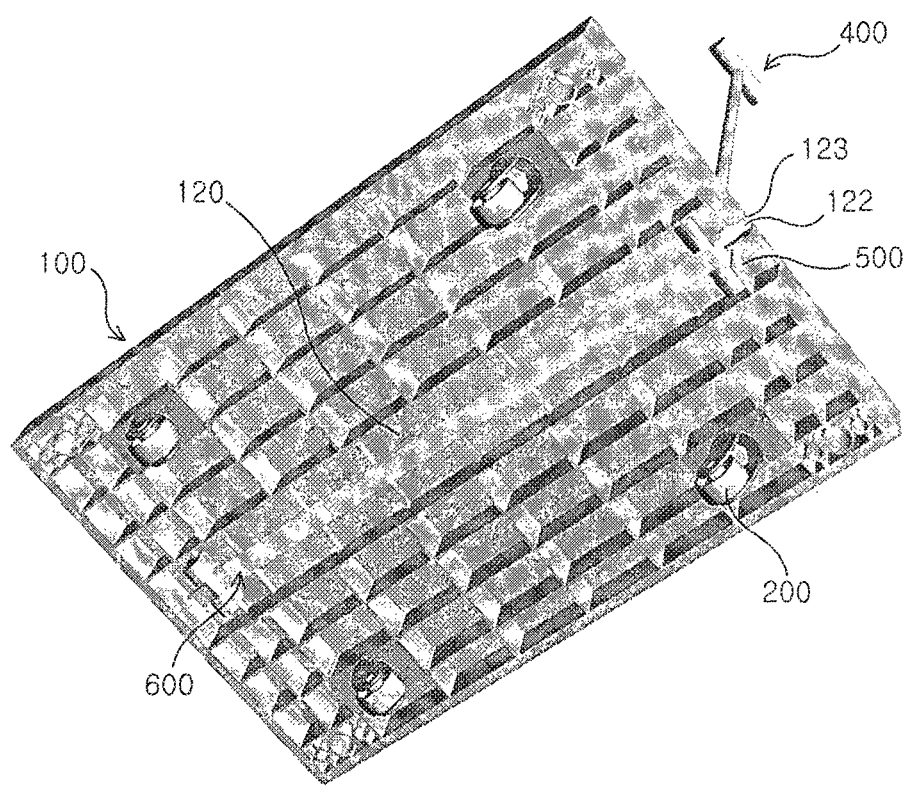
FIG. 3 is a bottom perspective view of cart with easy accommodation of a handle by a spring according to the embodiment of the present invention.

FIG. 3 is a bottom perspective view of the cart with easy accommodation of a handle by a spring according to the embodiment of the present invention.

Referring to FIG. 3, a front side refers to a portion of the loading plate 100 at which the cut groove 122 is formed, and a rear side refers to a portion opposite to the portion at which the cut groove is formed.

The cut groove 122 is a groove for allowing the handle member 400 to expose upward from a lower side of the loading plate 100.

Meanwhile, the loading plate 100 may be manufactured through injection molding such that the cut groove 122 and the space 120 are integrally formed.

Here, the space 120 is an elongated groove formed at a middle portion of the loading plate 100, that is, a passage through which the handle member 400 can move.

The configuration of the driving wheels 200, the handle member 400, the stopper 500 and the spring unit 600 is illustrated on a lower side of the loading plate 100. The cover coupled to a lower side of the space 120 is omitted in FIG. 3, and the cover is separately illustrated in FIG. 4.

The plurality of driving wheels 200 is provided on the lower side of the loading plate 100, and is typically four. The four driving wheels can stably move.

Figure 4:
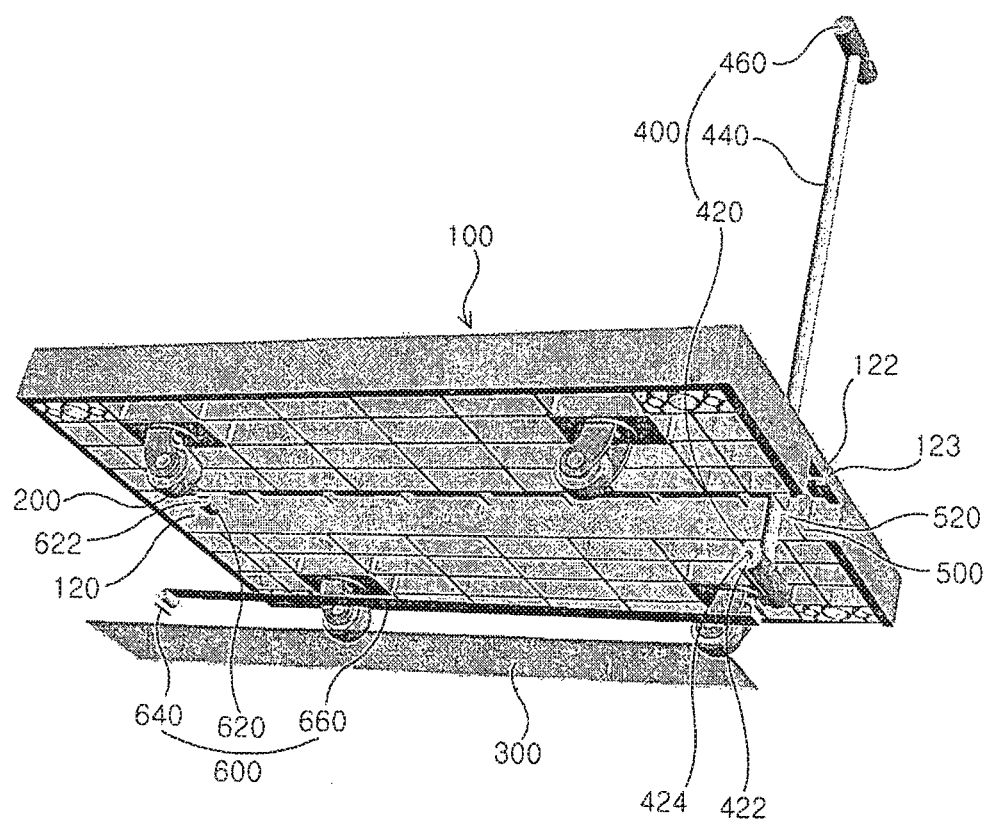
FIG. 4 is an exploded diagram of FIG. 3.

FIG. 4 is an exploded diagram of FIG. 3.

The cover 300 can support the handle member 400 provided in the space 120 by being coupled to the lower side of the space 120 to close the space 120.

Here, since the cover 300 is separated from and is coupled to the space 120, it is possible to easily repair the cart.

Here, the cover 300 may be coupled to the space 120 through bolting, or may be coupled to the space by forming grooves on the inner side of the lower side of the space and pushing the cover in an opened direction in a sliding manner.

The handle member 400 is provided to pull the loading plate 100, and is provided so as to be accommodated in the space 120 by the spring unit 600. When the handle member is rotated by being pulled with a force stronger than a rotation restoring force of the spring unit 600, the handle member is exposed to the upper side of the loading plate 100 which is an upper side of the cut groove 122.

Here, the spring unit 600 is provided so as to be fixed to the rear side of the space 120.

Here, the spring unit 600 includes fixation members 620 which are provided the rear side of the space, a rotational shaft 640 which is provided at the fixation member 620, and a spring 660 which is wound around the rotational shaft 640 and of which the end thereof is connected to the handle member 400 to allow the handle member to be accommodated in the space by the rotation restoring force when an external force is cancelled.

Specifically, the fixation members 620 are paired so as to be separated from each other on both sides, and accommodation grooves 622 are respectively formed in the insides thereof. Both ends of the rotational shaft 640 are rotatably supported by being inserted into the accommodation grooves 622.

In this case, the fixation members 620 are opened forward and are connected to the accommodation grooves 622. Thus, the fixation members can be easily connected to and separated from the accommodation grooves 622 by inputting and outputting the rotational shaft 640 to the fixation members 620 in the opened direction.

The handle member 400 is a bar-shaped coupling member, and specifically includes a lower bar 420 which is connected to the spring unit 600, an intermediate bar 440 which is connected to a central portion of the lower bar 420 at a right angle, and an upper bar 460 which extends from an end of the intermediate bar 440 at a right angle. The handle member has a T shape as a whole.

Here, since the lower bar 420 and the upper bar 460 move in the space 120, a length of the lower bar 420 corresponds to a width of the space 120, and thus, these bars are preferably guided.

The lower bar 420 is provided with a first hole 422 which is formed in one end thereof in a longitudinal direction and penetrates from the outside to the inside, a second hole 424 of which a penetrating area is greater than that of the first hole formed in the inside, and an engagement groove that communicatively connects these holes. In such a configuration, the end of the spring 660 can be fixed.

Specifically, the first hole 422 is cut off from an outer peripheral surface of the lower bar 420 to the inner central portion thereof, and the second hole is cut off from one end of the lower bar 420 at a predetermined depth. The second hole is formed in the inside, and is communicatively connected to the first hole.

An engagement member having a size corresponding to the second hole 424 is formed in the end of the spring 660, and is fixed by being inserted into the second hole 424 which is one end of the lower bar 420. The spring 660 can extend outward by the first hole 422.

Since the size of the engagement member at the end of the spring 660 is equal to a size of the second hole 424 and is greater than a size of the first hole 422, the engagement member is not separated outward.

Since the second hole 424 formed in the lower bar 420 is opened, a finish cap which is coupled to the end of the lower bar 420 to close the second hole 424 may be further provided.

Meanwhile, rollers may be further provided on both sides of the lower bar 420, and the handle member 400 moves in a rolling motion with respect to the cover 300 within the space 120. Thus, it is possible to minimize the friction of the handle member during the movement.

The stopper 500 is provided on the cut groove 122 of the space 120 to prevent the handle member 400 from being separated.

Specifically, the stopper 500 interferes with the lower bar 420, and is formed in a plate shape in which a hole 520 having a diameter greater than that of the intermediate bar 440 is formed in the central portion. It is possible to limit a movement distance of the handle member 400 while allowing the handle member to move due to the stopper.

That is, when the handle member 400 moves to the outside of the loading plate 100, the lower bar 420 is prevented from being separated by engaging with the stopper 500.

Here, the stopper 500 is positioned between the upper bar 440 and the lower bar 420 of the handle member 400, and rubber mounts that absorbs the impact are preferably provided on inner and outer sides of the stopper 500.

For example, after the handle member 400 is used while being exposed to the upper side of the loading plate 100, when the external force is canceled, the handle member 400 is automatically accommodated in the space 100 which is the lower side of the loading plate 100 by the rotation restoring force of the spring unit 600. In this case, the rubber mounts are provided at the handle member 400 in order to minimize the impact with the stopper 500.

The handle member 400 is moved to the front side of the space 120 in the opened direction, and is rotated to the cut groove 122. Thus, the handle member can be exposed to the upper side of the loading plate 100.

Accordingly, an operator moves the handle member 400 toward the upper side of the loading plate 100 when necessary, and thus, it is possible to easily load the articles on the loading plate and move the handle member. When there is not handle member 400, it is possible to easily accommodate the handle member under the loading plate 100.

In this case, the handle member 400 is connected to the spring unit, and is automatically accommodated when the external force is cancelled. Therefore, when the cart moves in a narrow space, it is possible to easily store the cart.

Figure 5:
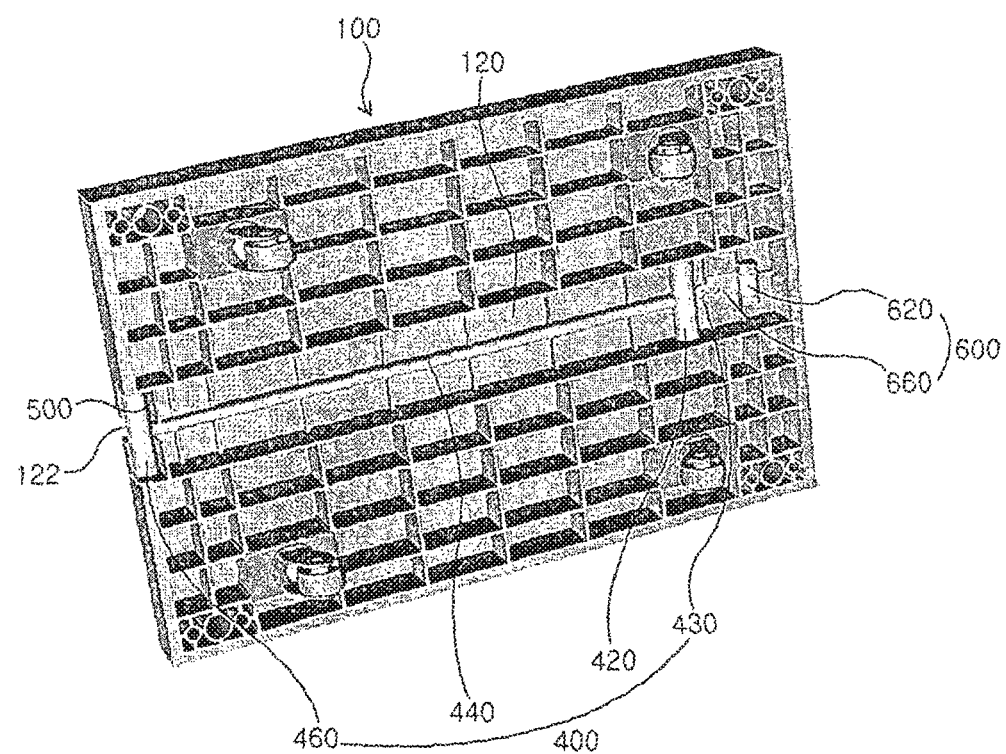
FIG. 5 is a diagram showing an example in which the cart with easy accommodation of a handle by a spring according to the embodiment of the present invention further includes hooks.

FIG. 5 is a diagram showing an example in which the cart with easy accommodation of a handle by a spring according to the present invention further includes hooks.

Referring to FIG. 5, hooks 430 that are connected to the end of the spring 660 are further provided at the lower bar 420, and thus, the lower bar 420 can be rotated around the spring unit 600. It is possible to easily expose the handle member 400 to the upper side of the loading plate 100.

As described above, it can be seen that the present invention has a basic technical concept in which there is provided the cart with easy accommodation of a handle by a spring, and it is apparent to those skilled in the art that various modifications are possible within the basic concept of the present invention.

What is claimed is:

1. A cart with easy accommodation of a handle by a spring, comprising:
   a loading plate (100) that is configured to load articles on an upper side thereof, and is provided with a cut groove (122) which is formed at a front end to vertically penetrate the loading plate and a space (120) which is formed on a lower side to have an opened front end, horizontally penetrates from the front end to a rear end, and is communicatively connected to the cut groove;
   driving wheels (200) that are provided on a lower side of the loading plate;
   a cover (300) that is coupled to a lower side of the space;
   a handle member (400) that is accommodated in the space, is moved toward the front end of the loading plate by an external force, is rotated to the cut groove, and is exposed to the upper side of the loading plate;

a stopper (500) that is formed in the space so as to be close to the cut groove, and prevents the handle member from being separated from the stopper (500); and a spring unit (600) that includes a fixation member (620) which is provided at a rear side of the space, a rotational shaft (640) which is provided at the fixation member, and a spring (660) which is wound around the rotational shaft and of which an end is connected to the handle member to allow the handle member to be accommodated in the space by a rotation restoring force when an external force is cancelled, wherein the handle member (400) includes a lower bar (420) which is connected to the spring, an intermediate bar (440) which is connected to a central portion of the lower bar at a right angle, and an upper bar (460) which extends from an end of the intermediate bar at a right angle, a first hole (422) which is formed at one end in a longitudinal direction and penetrates from the outside to the inside, and a second hole (424) which is formed in the inside so as to have a penetrating area greater than a penetrating area of the first hole are formed in the lower bar (420), and the holes are communicatively connected, and engagement members having a size corresponding to the second hole are formed at the end of the spring (660), and are fixed by being inserted into one end of the lower bar.

2. The cart with easy accommodation of a handle by a spring according to claim 1, wherein the fixation member (620) is paired so as to be separated on both sides, accommodation grooves (622) are formed on the insides thereof, and both ends of the rotational shaft are rotatably supported.

3. The cart with easy accommodation of a handle by a spring according to claim 1, wherein the stopper (500) interferes with the lower bar, and has a plate shape in which a hole having a diameter greater than a diameter of the intermediate bar is formed in a central portion thereof.

4. The cart with easy accommodation of a handle by a spring according to claim 1, wherein hooks (430) that are connected to the end of the spring are further provided at the lower bar (420), and the handle member is rotated.

5. The cart with easy accommodation of a handle by a spring according to claim 1, wherein a fastening stopper (123) that protrudes toward both sides of an inlet is formed at the cut groove (122), and provides a fastening pressurization force to the intermediate bar, and the handle member is prevented from rotating when the handle member is coupled to the cut groove.

* * * * *